(12) United States Patent
Mossey et al.

(10) Patent No.: US 10,015,627 B1
(45) Date of Patent: Jul. 3, 2018

(54) SYSTEM AND METHOD FOR RELIABLE WIRELESS DEVICE LOCATION MAPPING

(71) Applicant: Rapid Focus Security, LLC, Burlington, VT (US)

(72) Inventors: Timothy Mossey, Burlington, VT (US); Ellery Crane, South Burlington, VT (US)

(73) Assignee: Rapid Focus Security, LLC, Burlington, VT (US)

( * ) Notice: Subject to any disclaimer, the term of this patent is extended or adjusted under 35 U.S.C. 154(b) by 0 days.

(21) Appl. No.: 15/814,033

(22) Filed: Nov. 15, 2017

(51) Int. Cl.
| | |
|---|---|
| *H04W 24/00* | (2009.01) |
| *H04W 4/02* | (2018.01) |
| *G01S 5/00* | (2006.01) |
| *G01S 5/04* | (2006.01) |
| *H04W 64/00* | (2009.01) |
| *G01S 5/02* | (2010.01) |
| *G06F 21/56* | (2013.01) |
| *H04L 29/08* | (2006.01) |
| *H04W 84/12* | (2009.01) |

(52) U.S. Cl.
CPC .............. *H04W 4/02* (2013.01); *G01S 5/0009* (2013.01); *G01S 5/0252* (2013.01); *G01S 5/04* (2013.01); *H04W 64/003* (2013.01); *G06F 21/56* (2013.01); *H04L 67/18* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2007/0005292 | A1* | 1/2007 | Jin | .......................... G01S 5/0289 |
| | | | | 702/150 |
| 2012/0092130 | A1* | 4/2012 | Chung | .................... G06Q 10/08 |
| | | | | 340/10.1 |
| 2013/0324165 | A1* | 12/2013 | Fujiwara | ............... H04W 12/06 |
| | | | | 455/457 |
| 2017/0092090 | A1* | 3/2017 | Lerner | ............... G08B 13/2462 |

* cited by examiner

*Primary Examiner* — Erika Washington
(74) *Attorney, Agent, or Firm* — Kurt Rauschenbach; Rauschenbach Patent Law Group, LLP

(57) ABSTRACT

A system and method of wireless device location mapping comprising measuring a signal strength of a wireless signal generated by the wireless device at a plurality of sensor devices positioned at a plurality of sensor locations; determining a range from each of the plurality of sensor devices to the wireless device based on the measured signal strength; and generating a plurality of ranging spheres, a respective one of the plurality of ranging spheres corresponding a respective one of the plurality of sensor devices and being centered at a respective one of the plurality of sensor locations and having a radius that is proportional to the determined range of the respective one of the plurality of sensor devices to the wireless device. The system and method further comprises generating a new radius for each of the plurality of ranging spheres by expanding the radius for each of the plurality of ranging spheres by a small increment while maintaining a ratio between any two of the radii of the plurality of ranging spheres, determining a number of intersection points and adding a location of each of the intersection points to a map.

19 Claims, 11 Drawing Sheets

($\Psi i, \Psi j, \Psi k$): SENSOR COORDINATES
($Ri, Rj, Rk$): INITIAL RADII ESTIMATES ($\Psi_i, \Psi_j, \Psi_k$): SENSOR COORDINATES
($R_i, R_j, R_k$): INITIAL RADII ESTIMATES ($R_i, R_j, R_k$): INITIAL RADII ESTIMATES (Ψi,Ψj,Ψk): SENSOR COORDINATES
(Ri,Rj,Rk): INITIAL RADII ESTIMATES

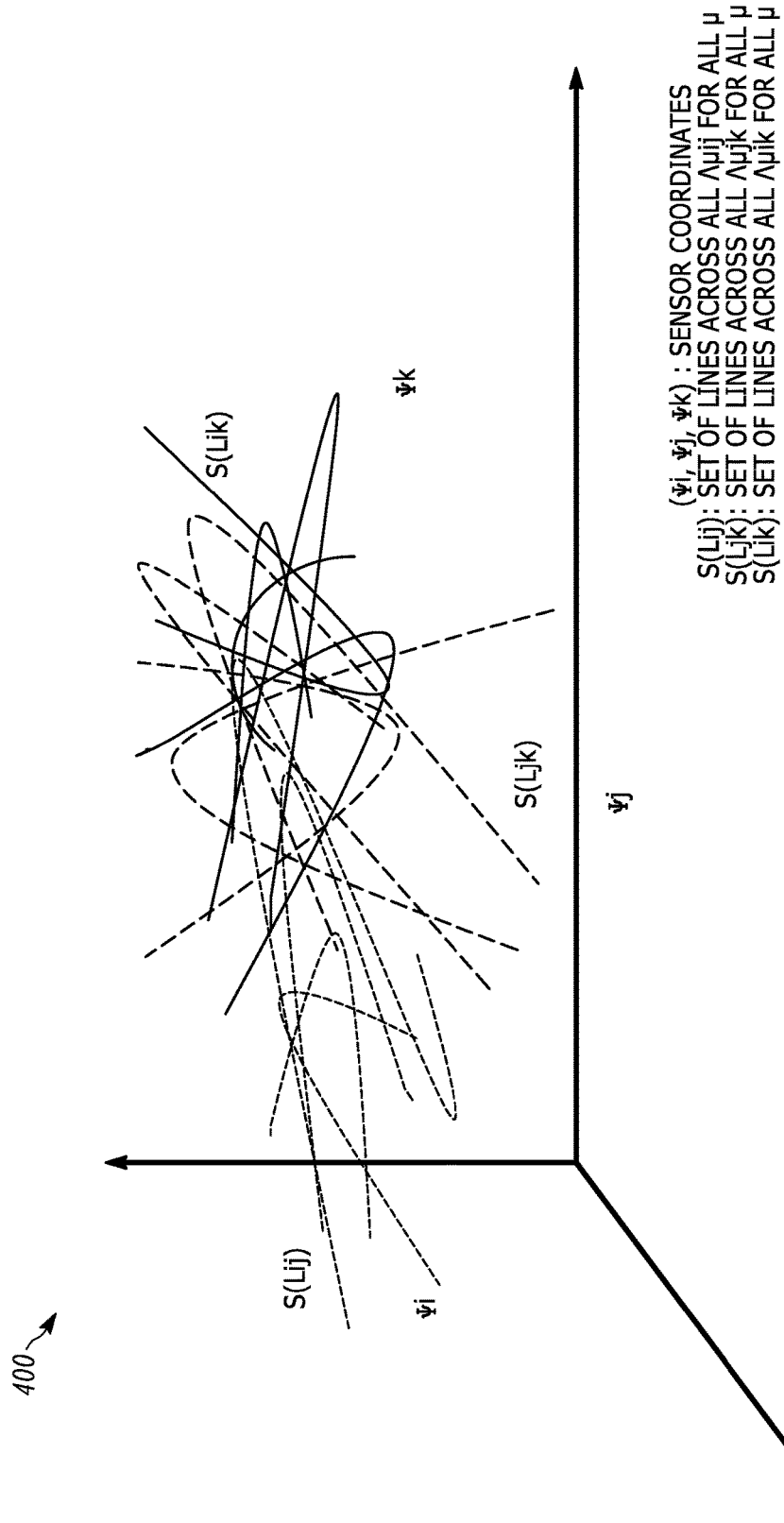

SYSTEM AND METHOD FOR RELIABLE WIRELESS DEVICE LOCATION MAPPING

The section headings used herein are for organizational purposes only and should not be construed as limiting the subject matter described in the present application in any way.

INTRODUCTION

Wirelessly connected smart devices play an increasing role in our individual and collective experiences. These devices vary widely in capability and include devices such as smartphones and wearables like health monitors. Their use spans beyond purely technological usage to a wide spectrum of what has now become essential modalities of interaction between heterogeneous entities, such as individuals, collectives, and communities. Some key examples of their use are social networking, augmented reality, law enforcement, health care, automated transportations, etc. With the advent of 4th Industrial Revolution and a world predicted to be networked by nearly 30 billion connected devices by 2025, accurate identification of each such individual device in a typical environment where those devices exist and operate in close physical proximity is a crucial prerequisite to ensure that those devices and the network of connections they collectively comprise are well protected from intrusions, eavesdropping, and malware.

Wirelessly connected smart devices are comprehensively monitored and tracked for a wide range of services, from protective (automatically updating software on the devices) to location-aware services (augmented reality, health monitoring, consumer applications). In a typical indoor environment that is densely populated with a large number of such heterogeneous devices, maintaining a comprehensive topological map of all those devices in that environment facilitates optimized delivery of those services. In case of a security event, such as intrusion/malware injection etc., maintaining a comprehensive topological map of the devices allows for the most efficient way of tracking the propagation of the attack agents and to be able to subsequently quarantine the already impacted devices and isolate the network segments that are now at risk to be penetrated by those attack agents. In case of uncertainties/inaccuracies in determining precise locations of each device, a location map allows for a better tolerance towards approximations as the mechanisms of threat detection/isolation etc. can be performed on segments of the network based on the contour plots that estimate the locations of the devices. A topological map of all the devices also enable computing their respective optimal routing paths and thereby facilitate swiftest updates in case of monitoring or security needs

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

FIG. 4A illustrates a diagram of a set of lines drawn from points of intersections across all expansions of an embodiment of a system and method of the present teaching.

DESCRIPTION OF VARIOUS EMBODIMENTS

Figure 1:
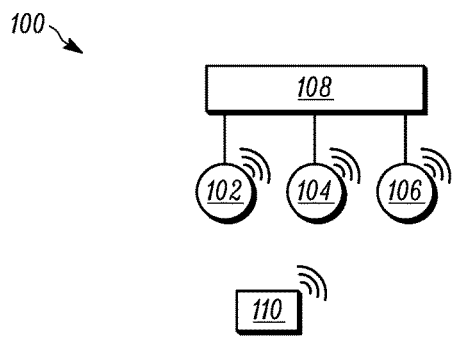
FIG. 1 illustrates a block diagram of an embodiment of system for locating wireless devices according to the present teaching.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the method of the present teaching can be performed in any order and/or simultaneously as long as the teaching remains operable. Furthermore, it should be understood that the apparatus and method of the present teachings can include any number or all of the described embodiments as long as the teaching remains operable.

The current mechanisms used to determine the location of wireless devices do not achieve the desired precision for many applications. The existing technology uses a combination of the Global Positioning System (GPS), or similar satellite based systems, and a Wi-Fi positioning system. Satellite-based GPS systems have substantial limitations in accurately determining wireless device locations in indoor environments because of the multipath issue related to radio signals bouncing off the surroundings structures and also signal loss suffered by GPS signals. Although the GPS and Wi-Fi positioning system are adequate for many large scale patterned usage applications, recent applications are best served by precise indoor location coordinates and comprehensive location maps. For example, these applications include many of the emerging protective applications, such as device and network security, threat detection, software update, and location-aware services (augmented reality, health monitoring, and some consumer applications). For many of these applications, the intrinsic inaccuracies of GPS and Wi-Fi positioning are often found to be inadequate.

Wi-Fi positioning systems use some combination of the following four techniques: (1) received signal strength indication; (2) device fingerprinting; (3) angle of arrival; and (4) time-of-flight. All of these mechanisms use some form of measurement of signal strength and/or angle of arrival on the Wi-Fi access points, in combination with the Wi-Fi hotspot database. A seeding mechanism is often used to populate such a database. For example, mobile device GPS coordinates can be correlated with known Wi-Fi access point MAC addresses to see the database. Hence, all these approaches suffer from the same problems of approximation, static data, and failure to incorporate movements of devices.

In a simple trilateration method, range estimates from multiple signal detectors are used to create intersection points between estimate signal range spheres. However, simple trilateration-based methods can fail due to inaccuracies of the initial range estimate, which are primarily due to signal attenuation leading to inaccurate initial range estimates.

One feature of the methods and apparatus of the present teaching is that a stepwise trilateration is performed on scalar range estimates. The system and method of the present teaching that uses stepwise trilateration outperforms simple trilateration in several ways. For example, simple trilateration does not account for skew in scalar range estimates and cannot negotiate a possible wireless device position if it uses too few range estimate intersection points, which is often less than three points. The present teaching can estimate a location using fewer intersection points.

Known trilateration approaches frequently fail to find any location estimate for some targets and signal readings. For example, they may not have three intersection points and therefore fail to determine a location. Additionally, the location estimates provided by simple trilateration approaches are often quite inaccurate. The method and apparatus of the present teaching not only provides an estimate for every set of data provided by a set of sensor devices, but also provides a far more accurate location estimate than previous approaches. Furthermore, the method and apparatus of the present teaching generates not just a "single point" location estimate, but can also provide a "heat map" or "contour plot" of potential locations when there is uncertainty in an exact location.

Also, known trilateration methods expand each circle around a sensor by a fixed amount, and then check for intersections. Once three intersections are found, these simple trilateration processes attempt to determine a position using the three intersection points. These known methods are "time-dependent" approaches, in that one particular step must be found at which at least three circles overlap in order to attempt to calculate a position. One aspect of the methods and apparatus of the present teaching is that they are "time-independent" in that the intersection space of all circles is calculated across all possible steps, and the intersections of those intersections are then used to generate a position estimate.

Another feature of the methods and apparatus of the present teaching is that they provide a much higher degree of accuracy in estimating locations of wireless devices by generating highly reliable contour plots of device distribution descriptions of the environment. In particular, the higher degree of accuracy can be achieved in indoor environments with a dense concentration of heterogeneous devices, and even in environments with relative uncertainties.

Another feature of the present teaching is that it uses two techniques of optimizing range estimates and refining calculation accuracies to improve simple known trilateration techniques. By applying those two techniques in a combinatorial manner, an accurate and comprehensive device location map is generated that cannot be generated using traditional trilateration mechanism.

FIG. 1 illustrates a block diagram 100 of an embodiment of system for locating wireless devices according to the present teaching. Multiple sensor devices 102, 104, 106 are located in one or more monitored networks. The sensor devices 102, 104, 106 may be any of a variety of known sensor devices with wireless interfaces. These sensor devices 102, 104, 106 can have known locations, which can be known a priori. These locations can also be determined by a variety of known systems and methods. For example, these sensor devices 102, 104, 106 can incorporate device-to-device peer awareness across a set of networked sensors to build a time-varying tensor field of sensor positions and velocities. See, for example, U.S. patent application Ser. No. 15/265,368 entitled "Reflective Network Device Position Identification", U.S. patent application Ser. No. 15/285,733 entitled "Self-Managed Intelligent Network Devices that Protect and Monitor a Distributed", U.S. patent application Ser. No. 15/617,103 entitled "Direction-Aware Device Location Services", and U.S. patent application Ser. No. 15/618,716 entitled "Method and Apparatus for Wireless Device Location Determination Using Signal Strength", which are all assigned to the assignee of the present application and which are incorporated herein by reference.

For example, U.S. patent application Ser. No. 15/265,368 discloses methods and apparatus for networked devices to share information for purposes of managing, identifying, and locating the devices using various methods. Using these and other known methods to share information amongst networked peer devices allows systems of the present teaching to achieve precise sensor device location information more quickly and efficiently than other known Wi-Fi and/or wireless positioning schemes.

The sensor devices 102, 104, 106 are connected to a server 108. The connections between the sensor devices 102, 104, 106 and the server 108 can be any of a variety of known connections including wired and/or wireless communication links and/or networks. The server 108 includes a processor that executes the algorithms and/or steps of the method. The sensor devices 102, 104, 106 also include a wireless interface that sends and receives wireless signals and a processor that executes algorithms and/or steps of the method. A wireless device 110 will enter the region that includes the sensor devices 102, 104, 106. The wireless device 110 includes a wireless interface that produces a wireless signal. The sensor devices 102, 104, 106 that are able to detect this wireless signal measure its signal strength. The sensor devices 102, 104, 106 then send the measured signal strength to the server 108. The server 108 uses the signal strength from each sensor device 102, 104, 106 to determine a scalar distance between that sensor device 102, 104, 106 and the wireless device 110. The server 108 also has the locations of each sensor device 102, 104, 106. In various embodiments, the sensor devices 102, 104, 106 can communicate their locations directly to the server 108, the server 108 can derive the locations of the sensors 102, 104, 106 based on other information, the locations can be preset into processor memory, or the locations are otherwise predetermined by another method.

In one method according to the present teaching, the server 108 generates a map of the region that includes a set of spheres around each sensor device's location, each with a radius that is proportional to the scalar distance to the wireless device 110 determined for that particular sensor device 102, 104, 106. The intersecting planes of these spheres can be used to compute the Cartesian coordinates of the device using a known trilateration mechanism. These directions can be used to determine a location of the wireless device 110 in the map. The location determination can be made as long as two or more directions are known and appropriately configured. In some cases, a third direction is also required.

Some embodiments of the present teaching use an inertial reference frame with respect to the location coordinates of the sensor devices 102, 104, 106. The location coordinates are noted and subsequent trilateration, plane intersection and intersection points are annotated. An inertial reference frame includes an environment in constant motion with same average velocity.

Each sensor device 102, 104, 106 receives and records a set of signal strength measurements from the wireless device 110. Each set of signal strength measurements is sent to the server 108 where the measurements are taken and converted to scalar range estimates. In some embodiments, the scalar range estimates are determined using a free-space loss formula. The application of the path loss formula in an isotropic free-space ignores the various loss or interference factors that can occur in the environments common for these sensor devices 102, 104, 106. Thus, a feature of the present teaching is the ability to provide accurate location determination in spite of the approximation inherent in the free-space loss formula used to provide the scalar range estimates from the measured signal strengths. Range estimates are then used to construct fields (circles or spheres) around each sensor device 102, 104, 106, where the range estimate for each sensor comprises the radius of the field (circle or sphere) constructed around it. Initial range estimate intersection points are evaluated, and if some exist, the range estimate for each sensor device 102, 104, 106 is stepwise reduced until no such points exist.

Fields are then stepwise expanded until a sufficient number of field intersections occur; e.g., equal to or greater than three. At which point, trilateration is attempted in the server 108 to position the wireless device 110. This process is repeated until a possible position is produced. This represents one embodiment of the stepwise trilateration method of the present teaching.

Another method according to the present teaching uses stepwise trilateration. A free-space path loss (FSPL) formula is used to generate initial radius estimates for each of the sensors measuring the target based on that sensor's signal strength measurement of the target. Free-space path loss is the attenuation of a wireless signal between two antennas in free space. The radii of the circles (or spheres) are then reduced while preserving their relative sizes until no overlap is detected between any circles. The circles (or spheres) are then stepped out by a very small relative amount, such as 1% in some specific methods, and all intersection points between any circles (or spheres) are recorded. This method is repeated until the entire intersection "space" has been mapped between all sensor devices 102, 104, 106.

In embodiments that use circles, the intersection points generated by this process can be connected to form line segments. As is clear to those skilled in the art the use of circles, rather than spheres, is a simplification of the system and method. Specifically, the simplification is achieved by mapping a 3-D Cartesian space to a dimensionally reduced 2-D space. The line segments generated by interconnected intersection points trace the boundary of where two particular circles intersect over the entire range of radii. With all such line segments recorded in a map, the intersection points of these line segments are then found. Each point represents the intersection of at least three circles. These points, which are the "intersections of intersections", are then used to generate a location estimate of the wireless device 110. In this stepwise trilateration method, a set of intersections of spheres is generated by systematically stepping up the sphere radii from initial values, and this set of intersections is used to provide an estimate of the wireless device location.

The density of the intersection points can be found using a kernel density estimation (KDE), which can then provide a position estimate of the "densest" point in the cluster. The KDE can also generate both heat maps and contour plots, which can provide a fuzzy estimate of the target location.

In some embodiments of this method, the intersection-of-intersections points themselves are "scored" by assigning a value for each sensor device 102, 104, 106 relative to how far off that point is from the prediction of the sensor's measurement of the wireless device's signal strength. Then taking the minimal score yields the estimate. In some embodiments of the method, the lowest percentile (for example, 10%) of scored points can be used, and the centroid of those points can be used as the estimate of the location of the wireless device 110. By using the points generated from the "intersections of intersections" of the present teaching, the estimate of the location of the wireless device 110 is more accurate as compared to the wireless device 110 locations derived by any prior art trilateration approaches.

In general, the sensor devices 102, 104, 106 of the present teaching can take the form of any device that transmits a wireless signal. The sensor devices 102, 104, 106 also receive wireless signals and form connections to the server 108 via various means. For example, a sensor device can take the form of a tablet, laptop, cell phone, or a smart phone. The sensor device can also be another specialized computing device, such as a gaming device, security device, or tracking device. The sensor device can be a wireless access point or cell tower. In one particular embodiment, the sensor devices 102, 104 is a device manufactured by Pwnie Express, Boston, Mass., the assignee of the present application. These devices include PWN PHONE®, PWN PRO, PWN PAD™ and/or PWN PLUG.

The wireless device 110 can be any device that emits a wireless signal. This signal can be any type of communication signal. The wireless device 110 can take many forms. For example, the wireless device can be any device within a so-called Internet of Things (IOT). For example, the wireless device can also be any one or more of the same kind of device as the sensor devices described above.

The server 108 can be any of a variety of known computing devices. The server 108 can be located on premise, and/or in close proximity to the sensor devices 102, 104, 106 or the server can be remote. In some embodiments the server 108 is embedded into one or more sensor devices 102, 104, 106. In some embodiments, the processor in server 108 is a conceptual abstraction and, as such, the processor may not reside in one single physical/virtual/cloud Operating System (OS) instance, or even a cluster of such localized instances. The processor can be a multi-layered distributed stack, and can also be delocalized to ensure minimum latency and/or efficiency. In these various embodiments, the sensor devices communicate information to the processor in a variety of known ways, including over the internet.

The processor in server 108 may operate in the cloud. The terms "cloud", and "cloud networking" as used herein includes services and networks that run over the public internet and work over any physical communications infrastructure, including wired or wireless infrastructures that may be privately or publicly owned, used and operated. The term "cloud" as used herein also includes so-called "private clouds" networking and services that run similarly over a private or proprietary infrastructure.

In some embodiments, the server 108 is an abstraction and not tied to a specific server device. The server 108 is a centralized solution stack. The server 108 is a distributed application hosted on multiple nodes or in cloud that is capable of performing real-time computation in the most efficient way. The server 108 may also be an application running on a single physical server with one or more processors. Thus, in some embodiments, the server 108 is a central service or an application.

Figure 2A:
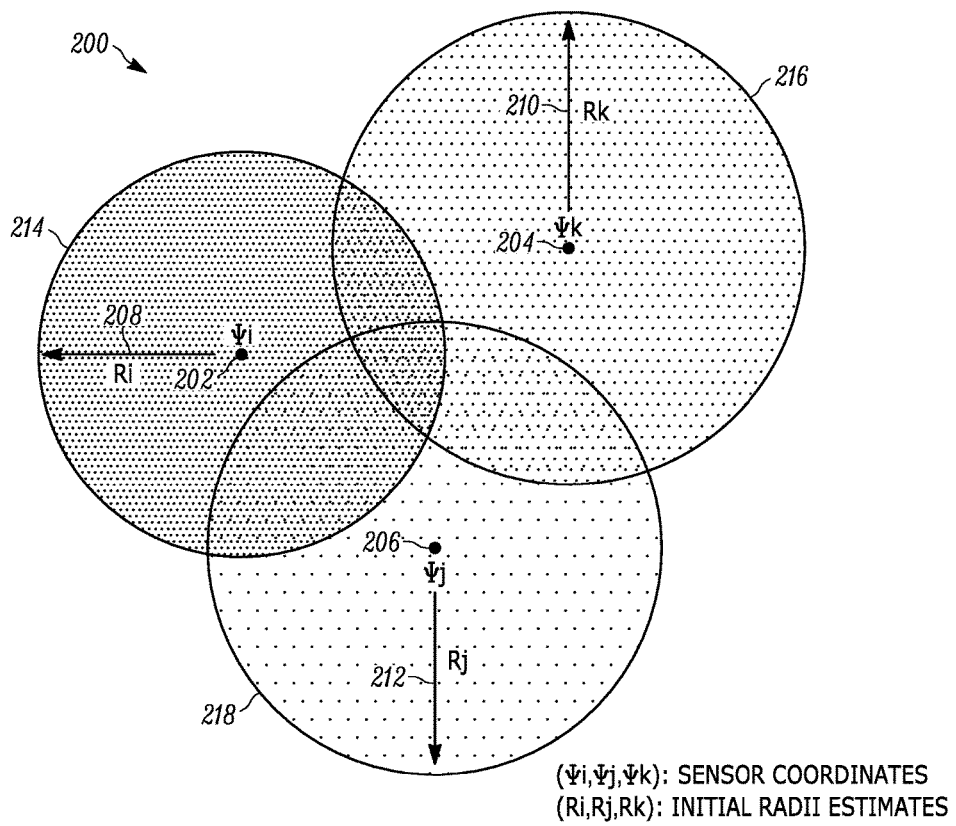
FIG. 2A illustrates a diagram of circles representing initial projected range estimates generated by an embodiment of a step of the system and method of the present teaching.

FIG. 2A illustrates a diagram of circles representing initial projected range estimates generated by an embodiment of a step of the system and method of the present teaching. In some embodiments, the method and system considers a three dimensional space and generates ranging spheres. For these embodiments, the circles depicted in the diagram are projections of these spheres to the two-dimensional drawing. One skilled in the art will appreciate the system and method can function using circles (for two-dimensional cases) or spheres (for three-dimensional cases). Consider an environment monitored by a set ($S_o$) of N sensors (Si: i=1 . . . N) whose locations are known as 3-D Cartesian coordinates with respect to an inertial reference frame. In various embodiments, the reference frame can be static or moving at a constant velocity. Some examples of places using static or moving frames include, an office building or a mobile health van moving with constant average speed. The coordinates 202, 204, 206 of each sensor are labeled as $\Psi i$ for each Si. Whenever a new wireless device is detected by the sensors, the method uses a sequence of steps to establish the coordinates of that newly discovered wireless device in the same reference frame, thereby identifying the topological location of that wireless device with respect to the sensors. In some embodiments, each such newly detected wireless device is located using the same steps. In this way, a reliable location map for all the wireless devices in the monitored environment is established. The system and method is agnostic to the type of wireless device, and applies equally to the entire spectrum of heterogeneous wireless devices.

In some embodiments, the sensors communicate with a centralized processing solution stack which maintains a comprehensive holistic topological map of the monitored environment. The topological map is seeded with the sensors' coordinates known a priori. The topological map is constantly updated for each newly detected device, where the location of which with respect to those sensors is accurately estimated using the stepwise trilateration of the present teaching. Hence, the positions of those devices can be formalized as coordinates in the same reference frame. The centralized solution stack can be running on a single server, on a cluster of servers, or on a cluster of containers, in an on-premise data center or in a cloud environment. Alternatively, the centralized solution stack can be running on a set of platform as a service (PaaS) services. The central solution with the comprehensive location map of sensors and devices is referred to herein as "C".

When a new device, D, enters the monitored environment, a subset S of the N sensors detect signals from that device at varying levels of signal strength. Depending on the environment and on the device in question, S may be identical to $S_o$. Each sensor Si in the subset S sends a recorded signal strength to the centralized solution C. The centralized solution C applies a free-space path loss formula and estimates potential scalar distances Ri of the device D from each of the sensors Si, ignoring any directionality aspect. The potential scalar distances Ri are depicted as radii 208, 210, 212 of the circles around coordinates 202, 204, 206 in FIG. 2A. One feature of the present teaching is that no triangulation or any angle-of-arrival based approach is needed to generate the diagram of FIG. 2A.

The centralized solution C then generates a series of those ranging spheres Pi, each centered around the corresponding Sensor Si, with radius Ri. These are depicted as circles 214, 216, 218 in FIG. 2A. The intersecting segments between these spheres provide the basis for trilateration. If a point lies on the surfaces of three intersecting spheres (Pi, Pj, Pk), then the values of the corresponding radii (Ri, Rj, Rk) and the 3-D coordinates of the center of each sphere, which are the known coordinates of the sensors ($\Psi i, \Psi j, \Psi k$), are adequate to compute the coordinate A of this point. In the simplest form of trilateration, this coordinate A identifies the location of the newly discovered device D.

As discussed above, this simple trilateration method may produce a set of multiple such intersecting surfaces, and hence a set of potential coordinates Set($\Delta$). Each element in this set is a potential location of the device D. Also such prior art simple trilateration methods suffer from considerable inaccuracy because of the inherent limitations of the initial scalar range estimates which are built purely by applying path-loss formula in an isotropic free-space. These prior art simple trilateration methods ignore the various other loss or interference factors that are inevitable in device dense anisotropic environment.

Figure 2B:
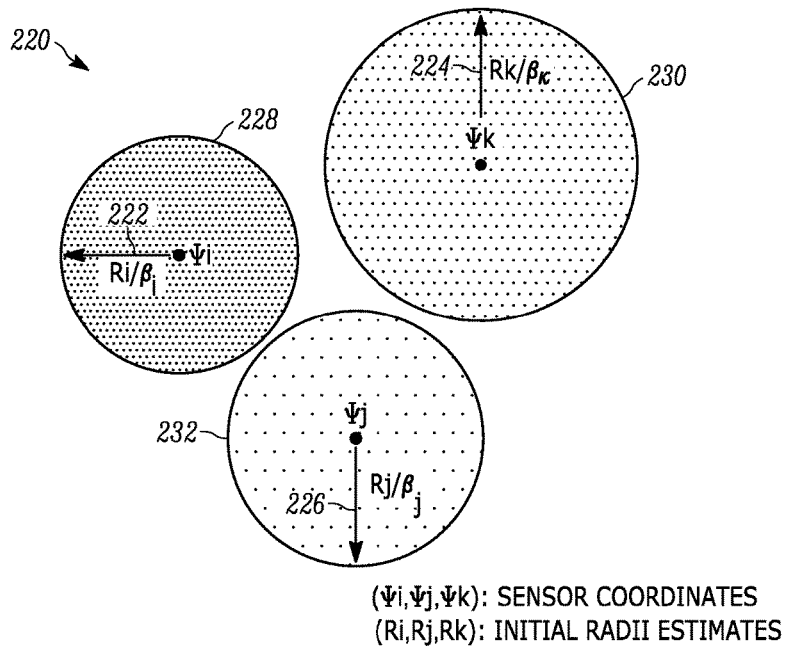
FIG. 2B illustrates a diagram of reduced circles representing an iteration of the projected range estimates generated by an embodiment of a step of the system and method of the present teaching.

FIG. 2B illustrates a diagram of smaller circles representing an iteration of the projected range estimates generated by an embodiment of a step of the system and method of the present teaching. The centralized solution C of the present teaching reduces the radii 222, 224, 226 of each intersecting sphere, shown as circles 228, 230, 232 in miniscule decrements, $\beta i$, while maintaining the ratio between any two radii (Ri/Rj, Rj/Rk etc.) until this point depicted in FIG. 2B in which there are no intersecting spheres.

Figure 2C:
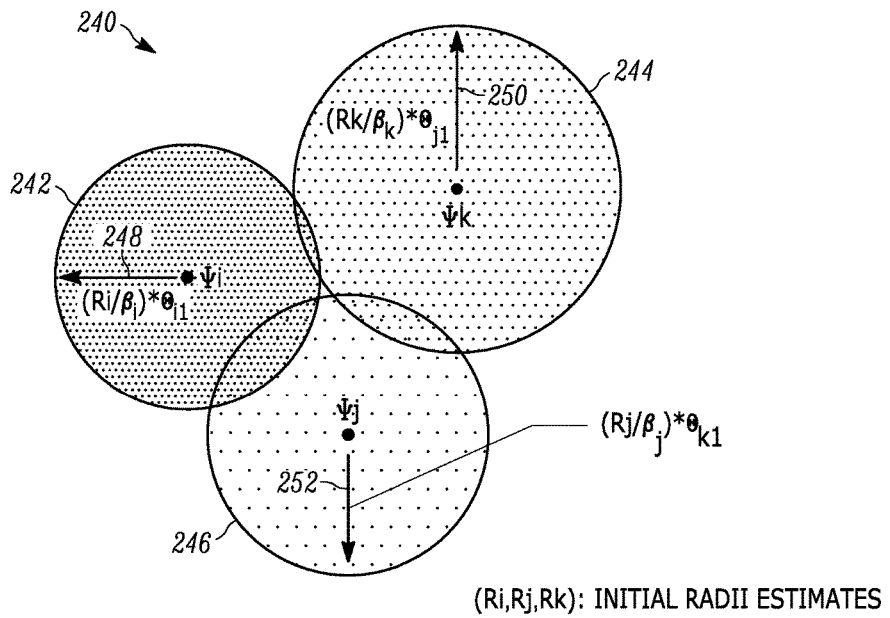
FIG. 2C illustrates a diagram of expanded circles representing an iteration of the projected range estimates generated by an embodiment of a step of the system and method of the present teaching.

FIG. 2C illustrates a diagram of expanded circles representing an iteration of the projected range estimates generated by an embodiment of a step of the system and method of the present teaching. Now each sphere, which is depicted by circles 242, 244, 246 has a radius 248, 250, 252 that has been expanded by miniscule increments $\theta i$, while maintaining the ratio between any two radii ($R_i/R_j$, $R_j/R_k$ etc.). FIG. 2C illustrates one expansion, $\theta i_1$, from the case illustrated in FIG. 2B. In general, the process of expansion eventually generates intersecting spheres. For each expansion step, a new set of intersection points are created between these spheres and the number of intersections is noted and the locations of the intersections are recorded in a map. The process of expansion and intersection determination is performed until all possible intersections are exhausted. Over M number of such expansions $E\mu$ ($\mu=1 \ldots M$) are generated. After each expansion $E\mu$ is a set of intersection points between any two spheres $P_i$, $P_j$ in that expansion step centered around sensors $\Psi_i$, $\Psi_j$.

Figure 2D:
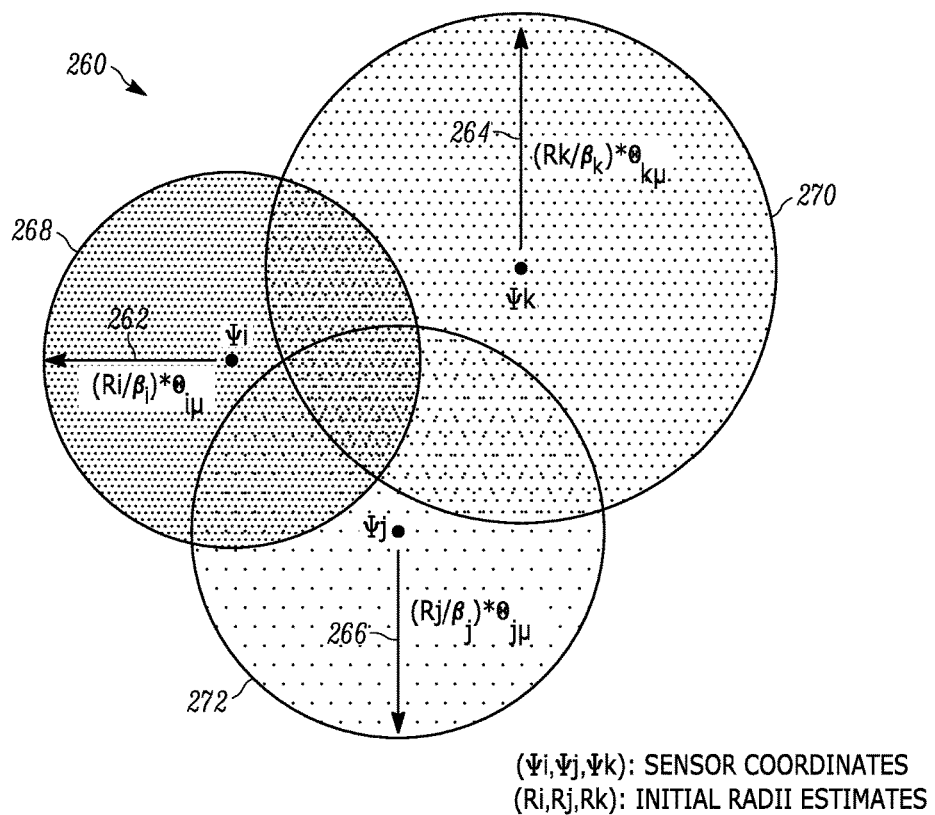
FIG. 2D illustrates a diagram of further expanded circles representing an iteration of the projected range estimates generated by an embodiment of a step of the system and method of the present teaching.
Figure 2E:
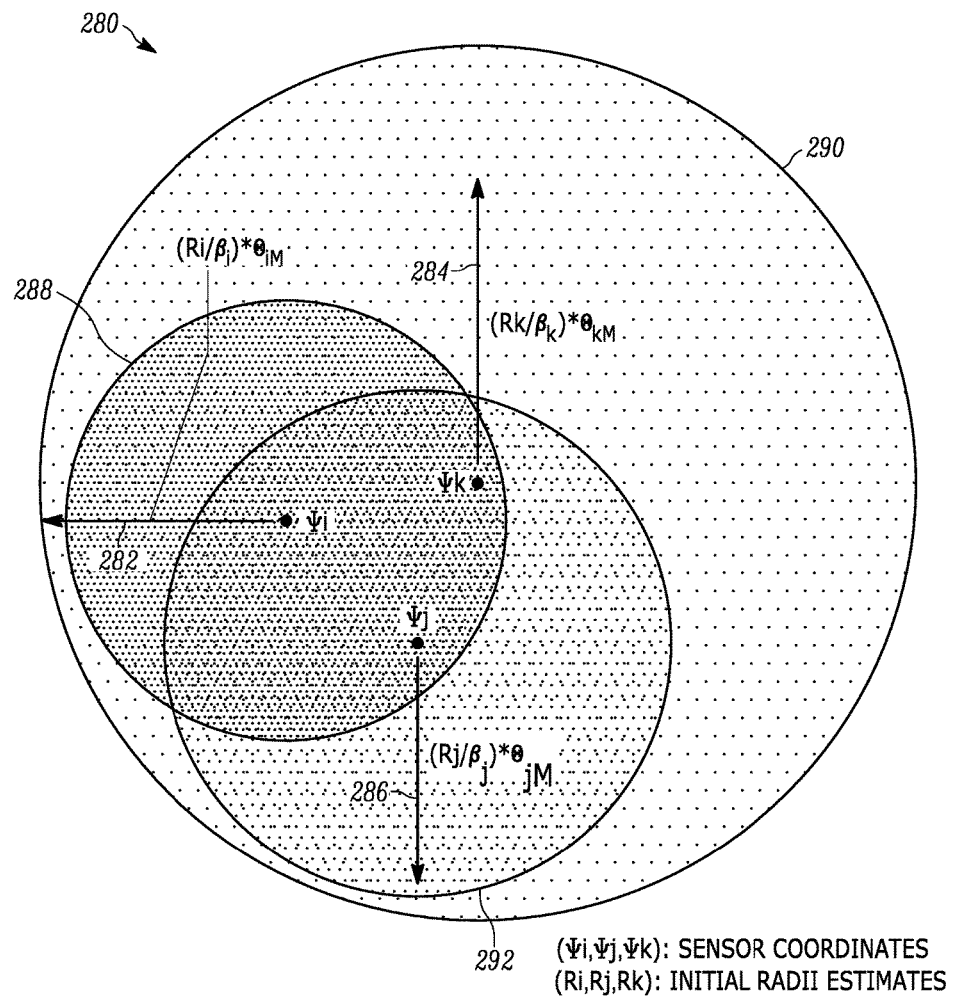
FIG. 2E illustrates a diagram of final expanded circles generated by a step of the system and method of the present teaching.

FIG. 2D illustrates a diagram of further expanded circles representing an iteration of the projected range estimates generated by an embodiment of a step of the system and method of the present teaching. The radius 262, 264, 266 of each circle 268, 270, 272 has been expanded from the case illustrated in FIG. 2B by $\theta i_\mu$. FIG. 2E illustrates a diagram of final expanded circles 280 generated by a step of the system and method of the present teaching. The radius 282, 284, 286 of each circle 288, 290, 292 has been expanded from the case illustrated in FIG. 2B by $\theta i_M$.

Figure 3A:
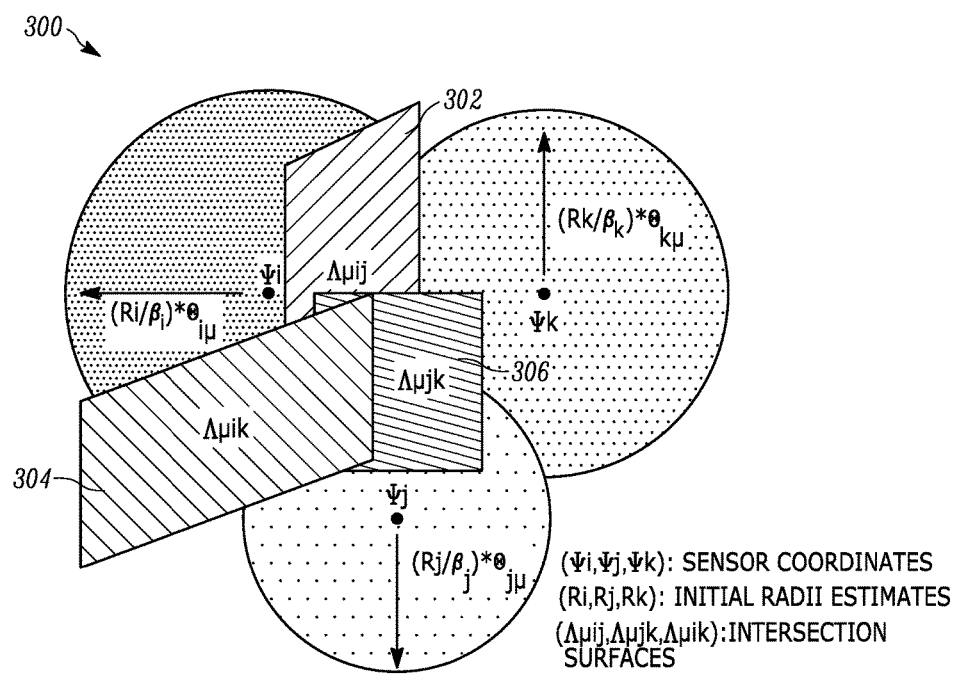
FIG. 3A illustrates a diagram of the intersection surfaces generated by an embodiment of a step of the system and method of the present teaching.

The number of intersection points is generally different for different combinations of spheres after different expansion steps. FIG. 3A illustrates a diagram of the intersection surfaces 300 generated by a step of the system and method of the present teaching. $Z\mu ij$ describes the set of those points of intersections between spheres $P_i$, $P_j$ after the $\mu$'th expansion. In this description it is understood that $Z\mu ij = Z\mu ji$.

All the points in $Z\mu ij$, once connected, trace 2-D surfaces 302, 304, 306, $\Lambda\mu ij$. $\Lambda\mu ij$ traces all the points of intersections between the spheres $P_i$, $P_j$ centered around the sensors $\Psi_i$ and $\Psi_j$.

Figure 3B:
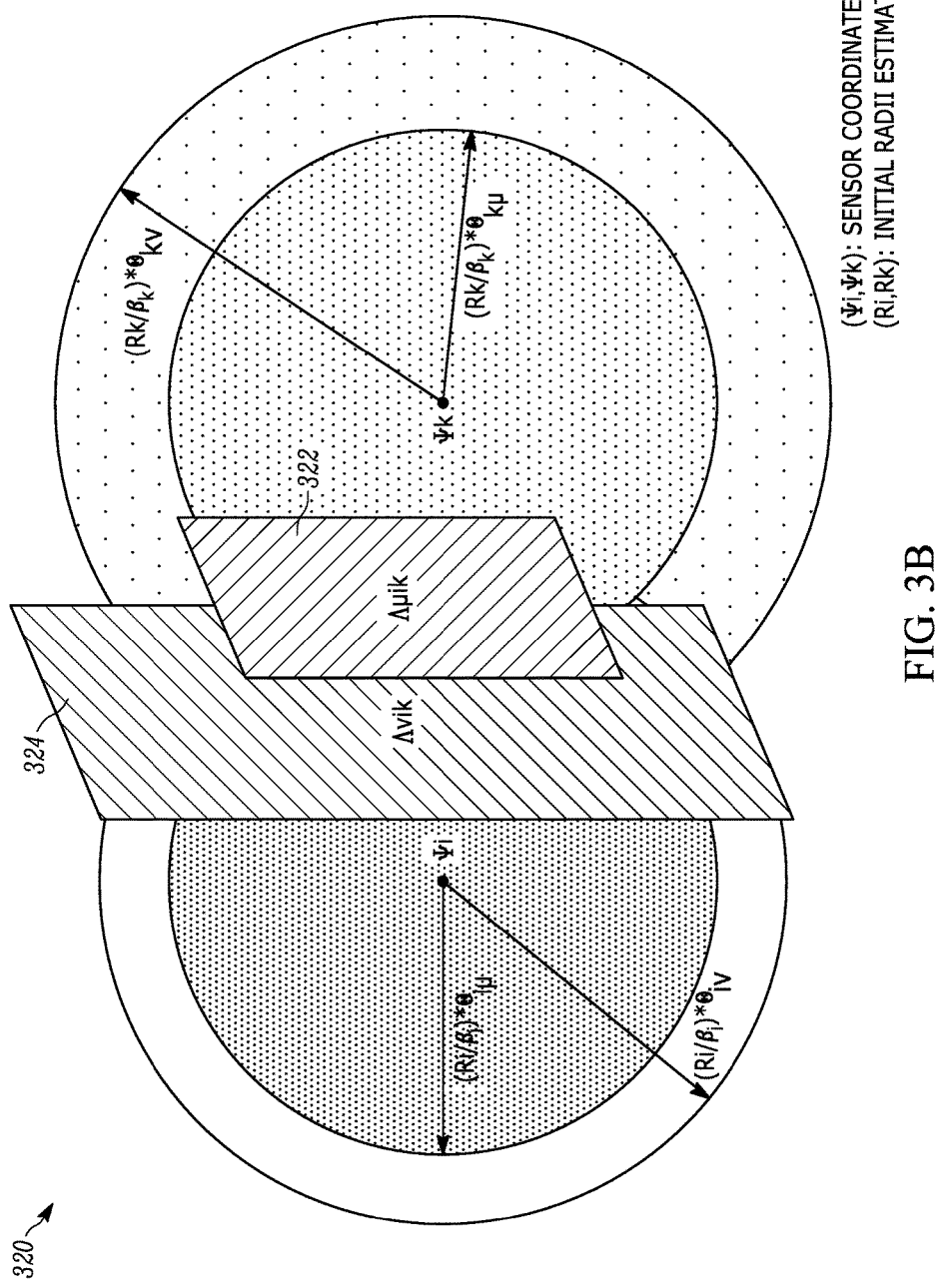
FIG. 3B illustrates a diagram of the intersection surfaces across different expansions generated by an embodiment of steps of the system and method of the present teaching.

FIG. 3B illustrates a diagram of the intersection surfaces across different expansion 320 generated by a step of the system and method of the present teaching. Two-dimensional surfaces 322, 324 result from two different expansions $\mu$ and $\nu$, where $\nu > \mu$.

The entire set of such 2-D intersection surfaces are computed across all expansions for any two possible combinations of the spheres. For N sensors, there are altogether $^NC_2$ such maximum possibilities per expansion. For altogether M expansions $E\mu(\mu=1 \ldots M)$, maximum $M*^NC_2$ number of surfaces, $\Lambda\mu ij$ ($\mu-1 \ldots M$, $i=1 \ldots N$, $j=1 \ldots N$), are generated. For this description $\Lambda\mu ij = \Lambda\mu ji$.

Each of these 2-D intersection surfaces describe all the intersection points between any two spheres for a given iteration of radii.

Intersection of any two such surfaces $\Lambda aij$ and $\Lambda bij$ across different iterations of expansions for the spheres centered around sensor coordinates $\Psi_i$ and $\Psi_j$ generate a set of curvilinear paths in 3-D with varying x, y, z coordinates that can be described by a single or a series of equations. These paths trace the boundaries where all spheres centered around two given sensor coordinates $\Psi_i$ and $\Psi_j$ across all range of radii through the process of expansion intersect. These sets of curvilinear paths can be referred to as a set of lines $S(L_{ij})$.

FIG. 4A illustrates a diagram of a set of lines 400 drawn from points of intersections across all expansions of an embodiment of a system and method of the present teaching. The total number of elements in that set depends on the distance, ($\Psi_i, \Psi_j$), the starting radii, $R_i$, $R_j$, before expansions but after the contractions, and M, the number of expansions needed to exhaust the intersection possibilities. These sets of lines, $S(L_{ij})=S(L_{ji})$, are generated for all combinations of two spheres across all expansions, and there are altogether $^NC_2$ such sets.

In one step of the method of the present teaching, all intersection points between lines in each of these different sets are determined. These points identify intersections between three or more spheres. Thus, these points represent the "intersection of intersections" for a three dimensional (spherical) stepwise trilateration.

Figure 4B:
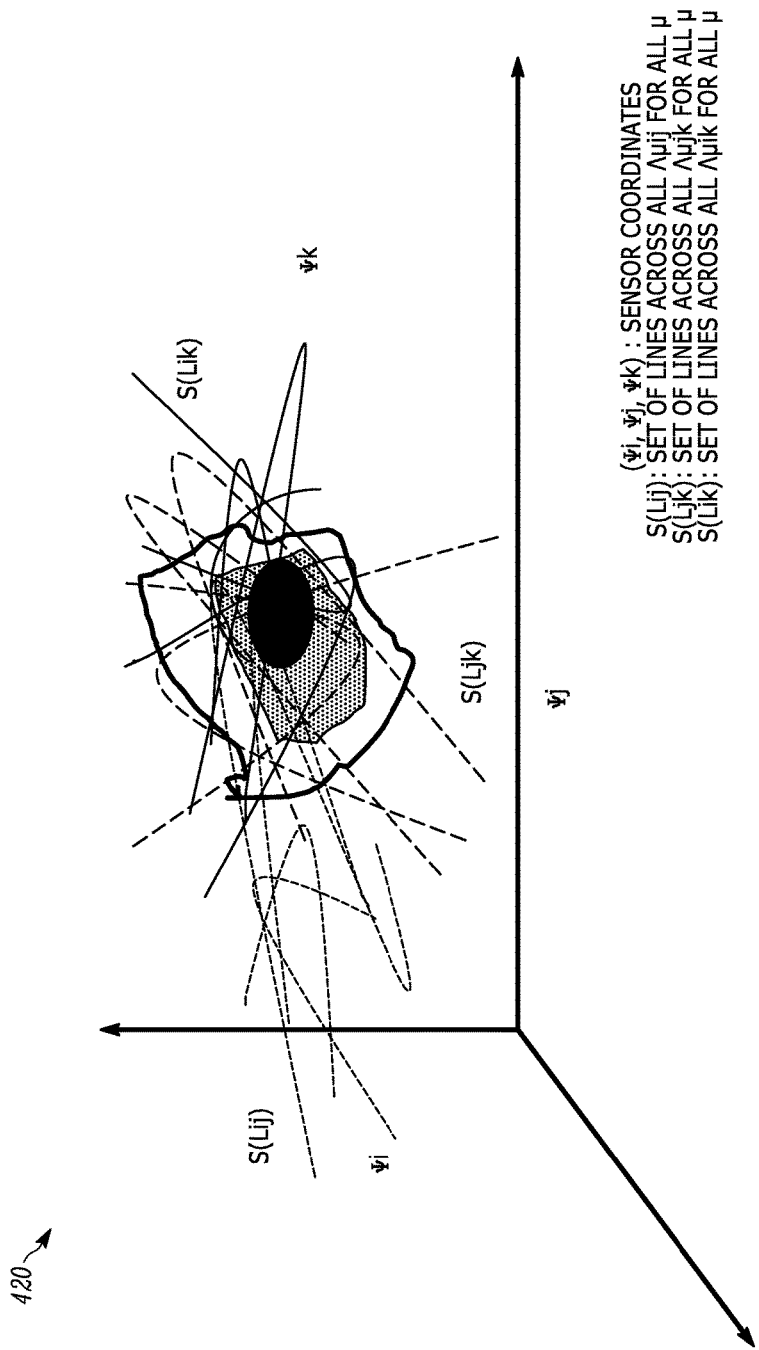
FIG. 4B illustrates a diagram a cluster containing all points of intersections between all sets of lines of FIG. 4A.

FIG. 4B illustrates a diagram a cluster 420 containing all points of intersections between all sets of lines of FIG. 4A. Each point, $\sigma$, in this cluster, $\Sigma$, are labelled by the intersecting spheres, and hence the sensor coordinates ($\Psi$) and the respective radii values, $R_i$, which depend on the iteration number, $\mu$, in the expansions. That is, a given $\sigma$ is uniquely defined by a set of ($\Psi_i$, $R_i$) values $S(\Psi_i, R_i)$ with at least three elements in that set. Consequently that $\sigma$ identifies a fully computable 3-D Cartesian coordinate, and hence a potential location of the device D.

In one step of the method, the coordinates of each $\sigma$ in the cluster $\Sigma$ are computed. However, this mechanism does not necessarily generate only a single point $\sigma$ in the point collection $\Sigma$. Rather this mechanism generates a cluster of $\sigma$ points. This cluster of points contributes towards a "heat map", or a small area in the overall map of the environment. The area indicates the point distribution density within its confines. That is, a distribution of the potential locations for the device D. Such a "heat map" or a contour plot can be computed from the coordinates of each $\sigma$ in the cluster of points $\Sigma$ using Kernel Density Estimation (KDE). Depending on the spread of the heat map and the degree of required accuracy in the location, sometimes a heat map alone may suffice. The mapped area, even though not precise, is highly reliable as this time-independent trilateration mechanism across the entire spectrum of possible intersection ensures the kind of estimation errors that plague the existing trilateration based positioning mechanisms suffer from do not exist with the present teaching.

Figure 5A:
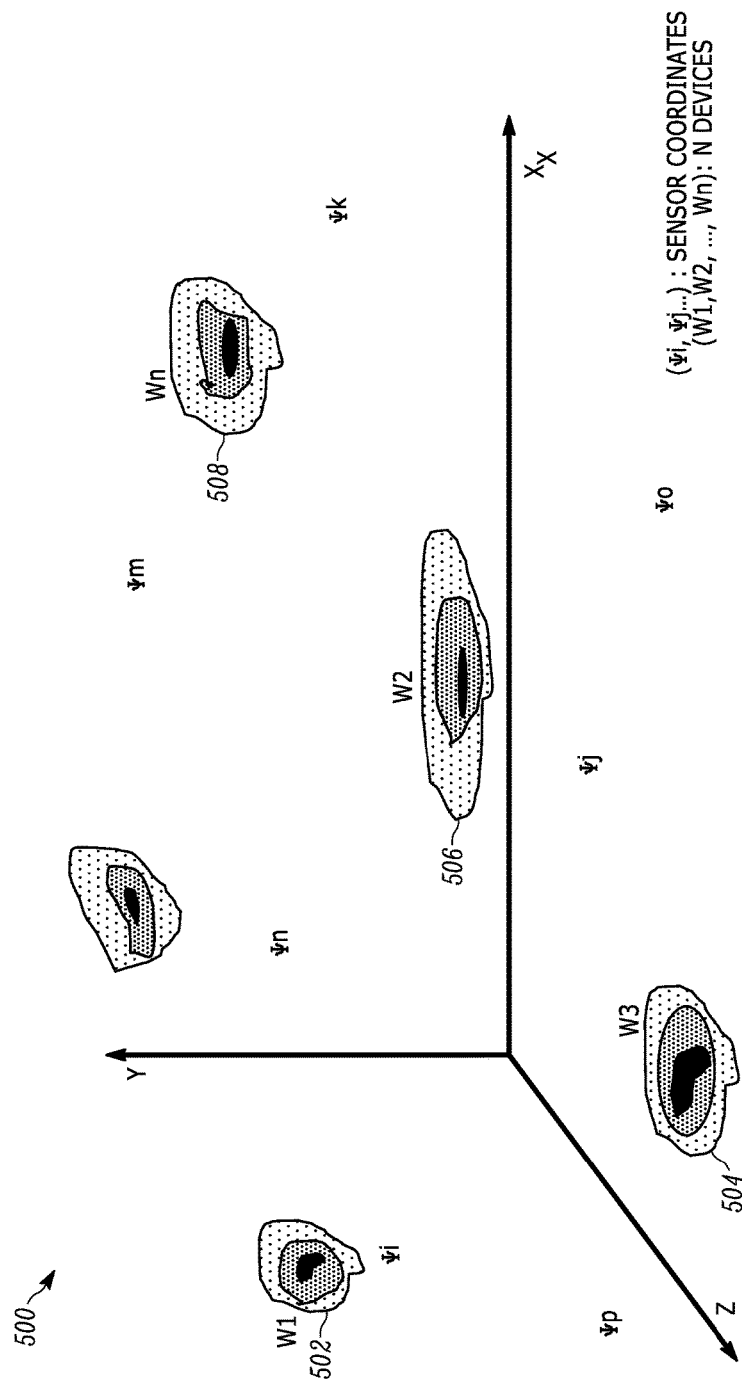
FIG. 5A illustrates a contour map generated by an embodiment of the system and method of the present teaching.

FIG. 5A illustrates a contour map 500 generated by an embodiment of the system and method of the present teaching. There are four regions 502, 504, 506, 508 that represent location estimates for four wireless devices. These location estimates are highly reliable. However, if the spread of the generated heat map is unacceptable, and a higher degree of precision is sought, two techniques can be applied to improve precision after the estimate is determined. The two techniques are independent of each other and so can be combined to further refine the estimated location. One embodiment of the steps is described as follows. First, a Kernel Density Estimation is performed as described above. Rather than generating contour plot, however, the KDE provides a determination of the densest point in the plot. Then a relevance scoring mechanism is used. Each intersection point, $\sigma$, is given a relative relevance score that depends on the following two items:

(1) The number of elements in the set $S(\Psi_i, R_i)$ that identifies the point $\sigma$. A higher number of elements in the set that identifies the point means a higher relevance. The lowest possible value is three. That is, if more sensors contribute to the intersection point, the more likely it is that the point represents the true location.

(2) The value of $R_i$ for each $\Psi_i$. In this case, the lower the value of $R_i$ the higher the relevance. That is, the less the radius of an intersecting sphere, and hence more accurate FSPL estimates are, the higher the likelihood that the point represents the true location.

Figure 5B:
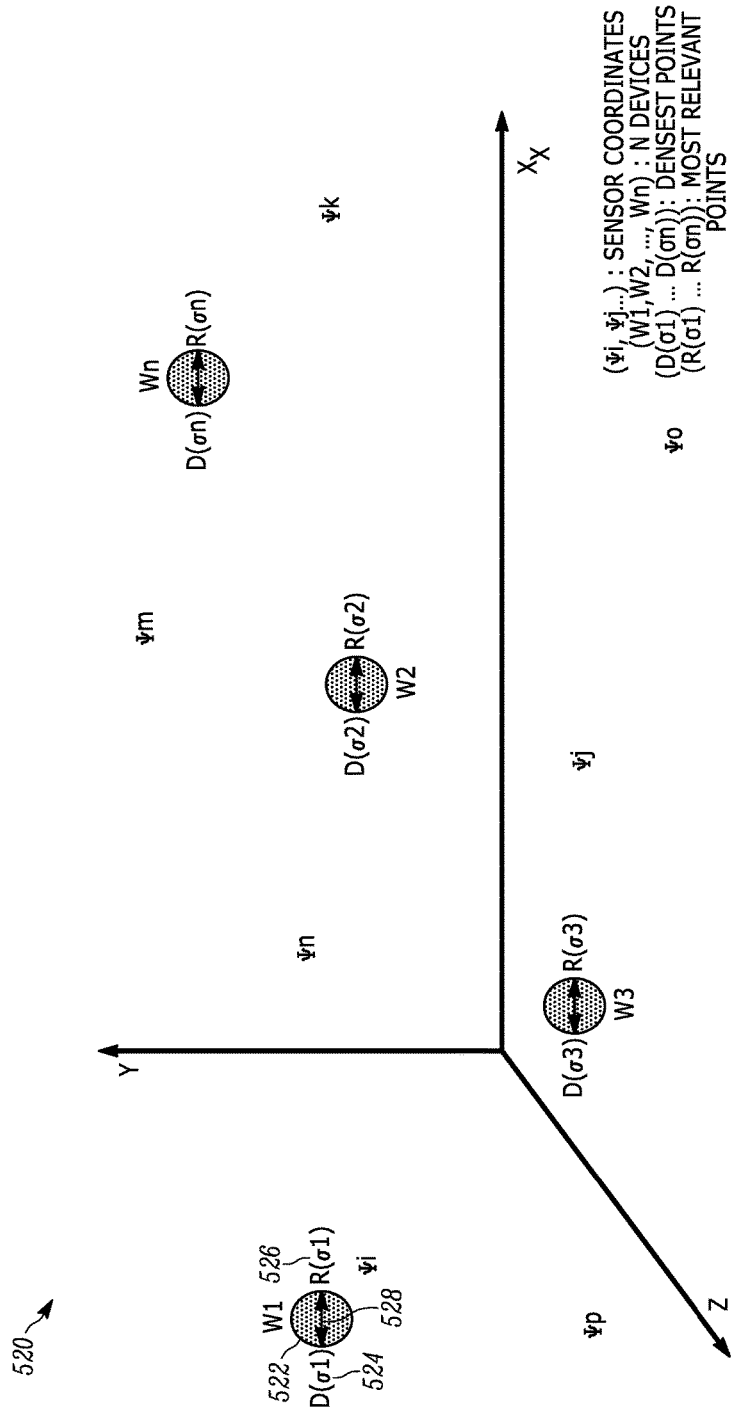
FIG. 5B illustrates a plot of device positions generated by an embodiment of the system and method of the present teaching that uses densest and most relevant points in clusters.

For each newly discovered wireless device, the system and method of the present teaching can generate a highly reliable contour plot which can be transposed on to an actual location map of the environment. FIG. 5B illustrates a plot of device positions 520 generated by an embodiment of the system and method of the present teaching that uses the densest and most relevant points in clusters. The densest point $D(\sigma)$ in that cluster represents likely candidate for the precise location of the newly discovered wireless device. The most relevant point, $R(\sigma)$, in that cluster, represents another highly likely candidate for the precise location. If the contour plot is small enough to satisfy the accuracy prerequisites for the locations map, then the method succeeds. If not, a circle 522 is drawn with $D(\sigma)$ 524 and $R(\sigma)$ 526 defining the two end points of the diameter 528. This circle 522 is considerably smaller than the region 502 in the contour plot provided in FIG. 5A and defines a very small area in the location map. If the diameter is significantly below the accuracy requirements, then either of those points are chosen to be the exact location coordinates.

Once the location of the wireless device is reliably mapped, then the wireless device location can easily be integrated into the topological map of the environment. That is, the location of this newly discovered device is placed in a topology with respect to other known network entities in the environment, such as WAPs, other hosts/devices, and/or sensors.

Figure 6:
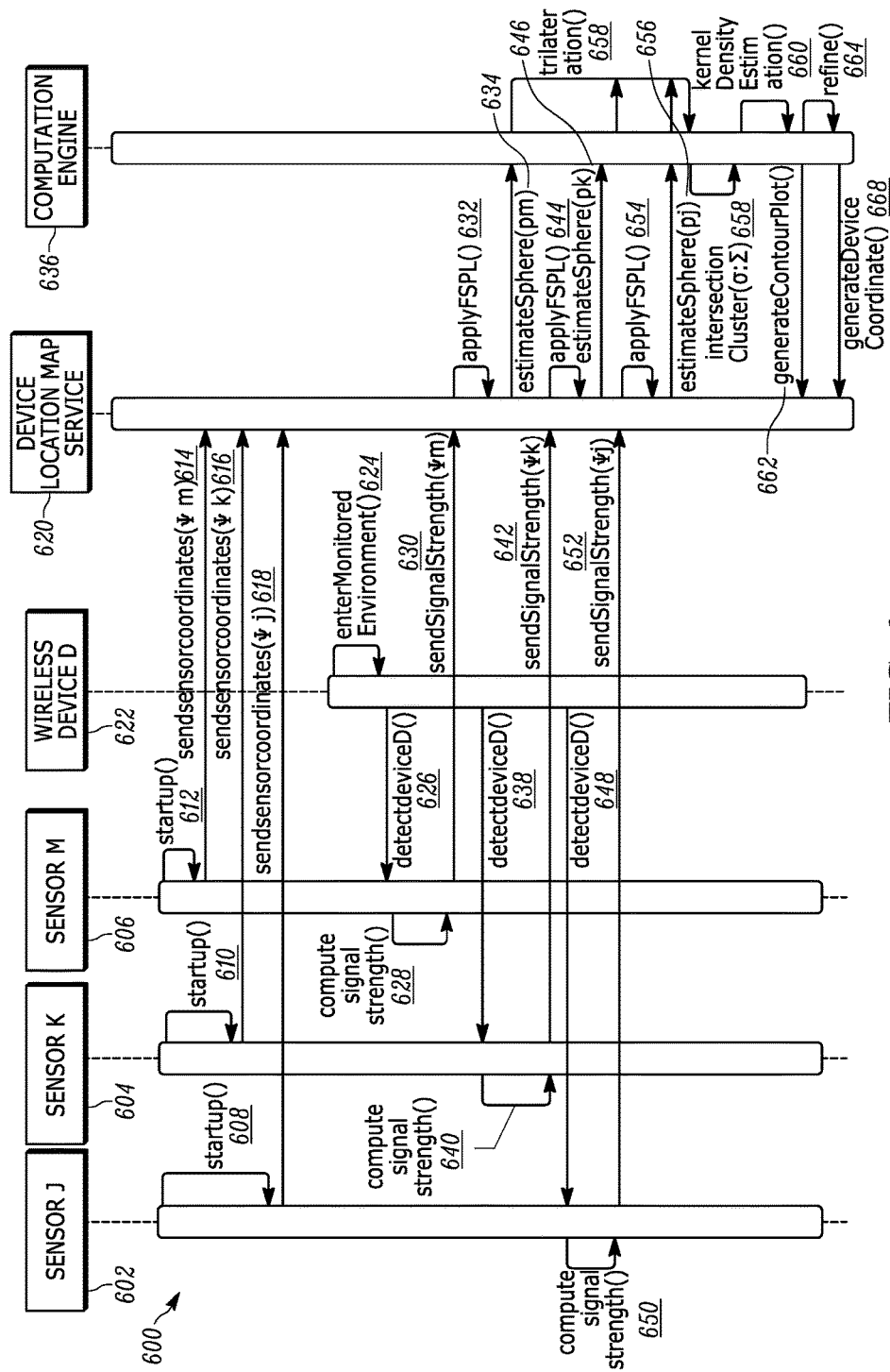
FIG. 6 illustrates a sequence diagram of an embodiment of a system and method for wireless device location of the present teaching.

FIG. 6 illustrates a sequence diagram 600 of an embodiment of a system and method for reliable wireless device location mapping of the present teaching. Three sensor devices 602, 604, 606 are shown, although fewer or more sensor devices may be utilized. The sensor devices 602, 604, 606 are used to monitor the wireless signals and traffic in a monitored location. Each of the sensor devices initiate a start-up process 608, 610, 612 and send their location coordinates 614, 616, 618 to a device location map service 620. The device location map service 620 may be a service running in the cloud, or a service being executed on a server in the monitored location. The device location map service 620 can also be a service being executed on a server in a remote location. In some embodiments, the locations of the sensor devices are known by the device location map service 620 in advance.

A wireless device 622 enters the monitored location and emits a wireless signal 624. More than one wireless device may be monitored at the same time, and/or sequentially. The wireless signal is detected 626 by a sensor device 606, and the sensor device computes the signal strength 628 of the detected wireless signal. The sensor device sends 630 the signal strength to the device location map service 620. The device location map service 620 applies a free-space path loss (FSPL) calculation 632 on the received signal strength and estimates a sphere radius based on the calculation and sends the sphere radius 634 to a compute engine 636.

The wireless signal from the wireless device 622 is detected 638 by a sensor device 604, and the sensor device 604 computes the signal strength 640 of the detected wireless signal. The sensor device 604 sends 642 the signal strength to the device location map service 620. The device location map service 620 applies a free-space path loss (FSPL) calculation 644 on the received signal strength to determine a range and then estimates a sphere radius based on the range and sends the sphere radius 646 to the compute engine 636.

The wireless signal from the wireless device 622 is detected 648 by a sensor device 602, and the sensor device 602 computes the signal strength 650 of the detected wireless signal. The sensor device 602 sends 652 the signal strength to the device location map service 620. The device location map service 620 applies a free-space path loss (FSPL) calculation 654 on the received signal strength and estimates a sphere radius based on the calculation and sends the sphere radius 656 to the compute engine 636.

The compute engine 636 performs a stepwise trilateration method 658 of the present teaching using the initial locations of the sensor devices 602, 604, 606 and the initial sphere radii determined by the FSPL calculation. Some embodiments of this stepwise trilateration method, as described in more detail above, first systematically reduce the sphere radii until no intersection of the spheres occurs, then systematically increase the sphere radii until a prescribed number of intersections of the spheres is realized. A trilateration is performed and, if successful a location is determined of the wireless device 622.

In some embodiments, the method includes further steps of systematically further increasing the sphere radii, while maintaining a map of the sphere intersections at each systematic increase. The generated map 658 sphere intersections is subject to KDE estimation 660 to generate a heat map of probable locations of the wireless device. This heat map, or contour map, is sent 662 to the device location map service 620. In addition, the KDE estimation is refined 664 to generate device coordinates 668 from a density plot.

It should be understood by those skilled in the art that the system and method of reliable wireless device location mapping of the present teaching can be used as a Wi-Fi positioning system, an indoor positioning system, or a system to provide a wireless device distribution topology. The system and method of wireless device location of the present teaching can be used to monitor and manage wireless networks by identifying precise locations of newly discovered devices without being formally connected to those devices.

The system and method of the present teaching can also be used to establish a network identity and topological position in the environment, and as a result ensure accurate detection and management of security threats from or to the wireless device. Steps may be taken based on the results of the application of a system and method of the present teaching to remediate security threats based on the location information provided.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:
1. A method of wireless device location mapping, the method comprising:
   a) measuring a signal strength of a wireless signal generated by the wireless device at a plurality of sensor devices, each of the plurality of sensor devices positioned at a respective sensor location;

b) determining a range from each of the plurality of sensor devices to the wireless device based on the measured signal strength;
c) generating a plurality of ranging spheres, each of the plurality of ranging spheres corresponding to one of the plurality of sensor devices and being centered at the respective sensor location of the one of the plurality of sensors and having a radius that is proportional to the determined range of the one of the plurality of sensor devices to the wireless device;
d) determining a number of intersection points of the plurality of ranging spheres;
e) reducing the radius for each of the plurality of ranging spheres by a small decrement while maintaining a ratio between any two of the radii of the plurality of ranging spheres then repeating the steps d) and e) until the number of intersection points is zero;
f) generating a map;
g) expanding the radius for each of the plurality of ranging spheres by a small increment while maintaining a ratio between any two of the radii of the plurality of ranging spheres, determining a number of intersection points of the plurality of ranging spheres with the expanded radius and adding a location of each of the determined intersection points to the map, and repeating step g) until the number of intersection points is zero; and
h) determining an estimate of a location of the wireless device based on the map.

2. The method of wireless device location mapping of claim 1 wherein the determining the range to the wireless device for each of the plurality of sensor devices based on the measured signal strength comprises determining the range using a free space propagation loss formula.

3. The method of wireless device location mapping of claim 1 wherein the determining the estimate of the location of the wireless device comprises determining the estimate of the location using an intersection of intersections based on the map.

4. The method of wireless device location mapping of claim 1 wherein the determining the estimate of the location of the wireless device comprises determining the estimate of the location using a kernel density estimation.

5. The method of wireless device location mapping of claim 1 wherein the estimate of the location of the wireless device comprises a contour plot.

6. The method of wireless device location mapping of claim 1 wherein the estimate of the location of the wireless device comprises a density plot.

7. The method of wireless device location mapping of claim 1 further comprising generating a topology of wireless devices based on the estimate of the location of the wireless device.

8. The method of wireless device location mapping of claim 1 further comprising initiating a threat remediation based on the estimate of the location of the wireless device.

9. A system that maps a location of a wireless device comprising:
a) a plurality of sensors, each of the plurality of sensors positioned at a respective sensor location in a monitored network and configured to measure a signal strength of a wireless signal emitted by the wireless device; and
b) a server connected to each of the plurality of sensors and configured to:
i) receive the plurality of measured signal strengths;
ii) determine a range to the wireless device for each of the plurality of sensor devices based on the plurality of measured signal strengths;
iii) generate a plurality of ranging spheres, each of the plurality of generated ranging spheres corresponding to one of the plurality of sensor devices and being centered at the respective sensor location of the one of the plurality of sensors and having a radius that is proportional to the determined range of the one of the plurality of sensor devices to the wireless device;
iv) determine a number of intersection points of the plurality of ranging spheres and, if the number of intersection points is not zero, reduce the radius for each of the plurality of ranging spheres by a small decrement while maintaining a ratio between any two of the radii of the plurality of ranging spheres; and repeat steps iii) and iv) until the number of intersection points is zero;
v) generate a map;
vi) expand the radius for each of the plurality of ranging spheres by a small increment while maintaining a ratio between any two of the radii of the plurality of ranging spheres, determine a number of intersection points and add a location of each of the intersection points to the map, and repeating step vi until the number of intersection points is zero; and
vii) determine an estimate of a location of the wireless device based on the map.

10. The system that maps the location of the wireless device of claim 9 wherein at least one of the plurality of sensor devices comprises a security device.

11. The system that maps the location of the wireless device of claim 9 wherein at least one of the plurality of sensor devices comprises a wireless access point.

12. The system that maps the location of the wireless device of claim 9 wherein at least one of the plurality of sensors are connected to the server using a wireless connection.

13. The system that maps the location of the wireless device of claim 9 wherein at least one of the plurality of sensors are connected to the server using the internet.

14. The system that maps the location of the wireless device of claim 9 wherein the wireless device is configured to initiate a malware attack.

15. The system that maps the location of the wireless device of claim 9 wherein the server comprises a remote server.

16. The system that maps the location of the wireless device of claim 9 wherein the server comprises a server located in a cloud.

17. The system that maps the location of the wireless device of claim 9 wherein the server is further configured to generate a contour plot.

18. The system that maps the location of the wireless device of claim 9 wherein the server is further configured to generate a density plot.

19. The system that maps the location of the wireless device of claim 9 wherein the server is further configured to determine a KDE based on the map.

* * * * *